(12) United States Patent
Ishii et al.

(10) Patent No.: US 7,426,399 B2
(45) Date of Patent: Sep. 16, 2008

(54) MOBILE COMMUNICATIONS SYSTEM, RADIO BASE STATION, SCHEDULING APPARATUS, SCHEDULING METHOD EMPLOYED IN THE SAME, AND PROGRAM THEREFOR

(75) Inventors: Naoto Ishii, Tokyo (JP); Kojiro Hamabe, Tokyo (JP); Takahiro Nobukiyo, Tokyo (JP); Nahoko Takano, Tokyo (JP)

(73) Assignee: NEC Corporation (JP)

( * ) Notice: Subject to any disclaimer, the term of this patent is extended or adjusted under 35 U.S.C. 154(b) by 670 days.

(21) Appl. No.: 10/900,457

(22) Filed: Jul. 28, 2004

(65) Prior Publication Data

US 2005/0054359 A1 Mar. 10, 2005

(30) Foreign Application Priority Data

Sep. 10, 2003 (JP) ............................. 2003-317621

(51) Int. Cl.
*H04B 7/00* (2006.01)
*H04Q 7/20* (2006.01)
*H04Q 7/00* (2006.01)

(52) U.S. Cl. ...................................... 455/513; 370/329
(58) Field of Classification Search ................. 455/513; 370/329

See application file for complete search history.

(56) References Cited

U.S. PATENT DOCUMENTS 6,091,717 A * 7/2000 Honkasalo et al. .......... 370/329

6,657,980 B2 * 12/2003 Holtzman et al. ........... 370/329
7,099,682 B2 * 8/2006 Ben-Eli ....................... 455/513
7,155,236 B2 * 12/2006 Chen et al. .................. 455/454

(Continued)

FOREIGN PATENT DOCUMENTS

| JP | 2003-152630 A | 5/2003 |
|---|---|---|
| JP | 2004-260261 A | 9/2004 |

OTHER PUBLICATIONS

Kim et al., "A Proportionally Fair Scheduling Algorithm with QOS and Priority In 1XEV-DO", School of Communication Engineering, Information and Communications University, Korea, PIMRC, pp. 2239-2243 (IEEE 2002).

(Continued)

*Primary Examiner*—Matthew Anderson
*Assistant Examiner*—Bobbak Safaipour
(74) *Attorney, Agent, or Firm*—Dickstein, Shapiro, LLP.

(57) ABSTRACT

The present invention provides a radio base station which can equally assign a transmission opportunity based on the radio channel quality. A mobile station selection unit issues a request for a metric notification to a metric notification unit corresponding to a mobile station notified by a data flow control unit, and receives metrics. The metric notification unit periodically receives radio channel quality information from a channel quality notification unit of an uplink signal analysis unit, obtains through a rank calculation unit the rank at the time when the channel quality is preferably arranged in a channel quality buffer according to the radio channel quality information, and notifies the mobile station selection unit of the result as metrics. The mobile station selection unit selects a mobile station having the smallest metrics notified by the metric notification unit, assigns radio resources to the mobile station, and notifies the data flow control unit of the assignment.

17 Claims, 7 Drawing Sheets

U.S. PATENT DOCUMENTS 7,170,904 B1 * 1/2007 Chang et al. ................ 370/447
7,203,463 B2 * 4/2007 Bahl et al. ................... 455/68
2002/0176380 A1 11/2002 Holtzman et al.

OTHER PUBLICATIONS

The United Kingdom Combined Search and Examination Report dated Feb. 10, 2005.

Jalali, A., et al.; "Data Throughput of CMDA-HDR a High Efficiency-High Data Rate Personal Communication Wireless System"; IEEE 51st Vehicular Technology Conderence (2000).

Kim et al., "A Proportionally Fair Scheduling Algorithm with QOS and Priority In 1XEV-DO", School of Communication Engineering, Information and Communications University, Korea, PIMRC, pp. 2239-2243 (IEEE 2002).

* cited by examiner

MOBILE COMMUNICATIONS SYSTEM, RADIO BASE STATION, SCHEDULING APPARATUS, SCHEDULING METHOD EMPLOYED IN THE SAME, AND PROGRAM THEREFOR

BACKGROUND OF THE INVENTION

1. Field of the Invention

The present invention relates to a mobile communications system, a radio base station, a scheduling apparatus, a scheduling method for use with them and a program therefor, and more specifically to a packet scheduling method of a radio base station in a mobile communications system which performs packet communications.

2. Description of the Prior Art

Recently, in the mobile communications system, data communications such as electronic mail, etc. including the browsing of data and images (still images and moving pictures) over the Internet have become widespread, and the demand for data communications has increased. In the W-CDMA (Wideband Code Division Multiple Access) which is the third generation mobile communications system, the HSDPA (High Speed Downlink Packet Access) for realization of the high-speed down packet communications has been standardized in the third generation partnership project (3GPP).

In the HSDPA, the high-speed packet communications are realized in the downlink shared channel, but a radio base station is designed to improve the throughput by the user multiple effect by assigning a transmission opportunity depending on the downlink radio channel quality for a plurality of mobile stations. The method of assigning a transmission opportunity is referred to as scheduling, and can be the following method.

The PF (Proportional Fairness) system (for example, refer to Non-Patent Document 1) is a scheduling method for equally assigning a transmission opportunity to a mobile station which is awaiting the transmission of a packet. In this PF system, for example, the "instantaneous radio channel quality/average radio channel quality" of a mobile station is obtained as metric, and a transmission opportunity is assigned to a mobile station having larger metric.

Therefore, since a relative quality for the average radio channel quality is represented as an index in this PF system, a mobile station having low average radio channel quality can also be assigned a transmission opportunity.

[Non-Patent Document 1] A. Jalali et. al, "Data Throughput of CDMA-HDR a High Efficiency-High Data Rate Personal Communication Wireless System", IEEE 51st Vehicular Technology Conference (2000)

However, in the conventional scheduling method, a transmission opportunity is assigned first to a mobile station having a larger amount of change in instantaneous radio channel quality for average radio channel quality. Therefore, a mobile station having a small change in radio channel quality is less frequently assigned a transmission opportunity although it has high radio channel quality, thereby unequally assigning a transmission opportunity.

BRIEF SUMMARY OF THE INVENTION

Thus, the present invention has been developed to solve the above-mentioned problem, and aims at providing a mobile communications system, a radio base station, and a scheduling apparatus which can equally assign a transmission opportunity based on the radio channel quality, a scheduling method for use with them and a program therefor.

A mobile communications system according to the present invention has a plurality of mobile stations for transmitting radio channel quality information using an uplink dedicated channel and a radio base station for communicating with the plurality of mobile stations and transmitting a packet to the plurality of mobile stations using a downlink shared channel. The radio base station includes: rank calculation means for arranging, in a preferable order, radio channel quality reported in an observation interval predetermined for each of the mobile stations, and calculating a rank of the radio channel quality; and assigning means assigning a transmission opportunity to the mobile stations depending on the rank calculated by the rank calculation means.

Another mobile communications system according to the present invention has a plurality of mobile stations for transmitting radio channel quality information using an uplink dedicated channel and a radio base station for communicating with the plurality of mobile stations and transmitting a packet to the plurality of mobile stations using a downlink shared channel The radio base station includes: rank calculation means for arranging, in a preferable order, radio channel quality reported in an observation interval predetermined for each of the mobile stations, and calculating a rank of the radio channel quality; obtaining means obtaining for each of the mobile stations an invalid frequency at which a transmission opportunity is not assigned when the rank of the radio channel quality is lowest; obtaining means obtaining for each of the mobile stations a difference between a rank of the radio channel quality and the invalid frequency; and assigning means assigning the transmission opportunity to a mobile station having a smallest difference.

A radio base station according to the present invention communicates with a plurality of mobile stations which transmit radio channel quality information using an uplink dedicated channel and transmits a packet to the plurality of mobile stations using a downlink shared channel, and includes: rank calculation means for arranging, in a preferable order, radio channel quality reported in an observation interval predetermined for each of the mobile stations, and calculating a rank of the radio channel quality; and assigning means assigning a transmission opportunity to the mobile stations depending on the rank calculated by the rank calculation means.

Another radio base station according to the present invention communicates with a plurality of mobile stations for transmitting radio channel quality information using an uplink dedicated channel and transmits a packet to the plurality of mobile stations using a downlink shared channel, and includes: rank calculation means for arranging, in a preferable order, radio channel quality reported in an observation interval predetermined for each of the mobile stations, and calculating a rank of the radio channel quality; obtaining means obtaining for each of the mobile stations an invalid frequency at which a transmission opportunity is not assigned when the rank of the radio channel quality is lowest; obtaining means obtaining for each of the mobile stations a difference between a rank of the radio channel quality and the invalid frequency; and assigning means assigning the transmission opportunity to a mobile station having a smallest difference.

A scheduling apparatus according to the present invention draws a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, and includes: rank calculation means for arranging, in a preferable order, radio channel quality reported in an observation interval predetermined for each of the mobile stations, and calculating a rank of the radio channel quality; and assigning means assigning a transmission opportunity to the mobile stations depending on the rank calculated by the rank calculation means.

Another scheduling apparatus according to the present invention draws a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, and includes: rank calculation means for arranging, in a preferable order, radio channel quality reported in an observation interval predetermined for each of the mobile stations, and calculating a rank of the radio channel quality; obtaining means obtaining for each of the mobile stations an invalid frequency at which a transmission opportunity is not assigned when the rank of the radio channel quality is lowest; obtaining means obtaining for each of the mobile stations a difference between a rank of the radio channel quality and the invalid frequency; and assigning means assigning the transmission opportunity to a mobile station having a smallest difference.

A scheduling method according to the present invention for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel includes: a first step of arranging on the radio base station, in a preferable order, radio channel quality reported in an observation interval predetermined for each of the mobile stations, and calculating a rank of the radio channel quality; and a second step of assigning a transmission opportunity to the mobile stations depending on the calculated rank.

Another scheduling method according to the present invention for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, includes: a first step of arranging on the radio base station, in a preferable order, radio channel quality reported in an observation interval predetermined for each of the mobile stations, and calculating a rank of the radio channel quality; a second step of obtaining for each of the mobile stations an invalid frequency at which a transmission opportunity is not assigned when the rank of the radio channel quality is lowest; a third step of obtaining for each of the mobile stations a difference between a rank of the radio channel quality and the invalid frequency; and a fourth step of assigning the transmission opportunity to a mobile station having a smallest difference.

A program according to the present invention for use with a scheduling method for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel is used by a computer of the radio base station to perform: a process of arranging, in a preferable order, radio channel quality reported in an observation interval predetermined for each of the mobile stations, and calculating a rank of the radio channel quality; and a process of assigning a transmission opportunity to the mobile stations depending on the calculated rank.

Another program according to the present invention for use with a scheduling method for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel is used by a computer of the radio base station to perform: a process of arranging, in a preferable order, radio channel quality reported in an observation interval predetermined for each of the mobile stations, and calculating a rank of the radio channel quality; a process of obtaining for each of the mobile stations an invalid frequency at which a transmission opportunity is not assigned when the rank of the radio channel quality is lowest; a process of obtaining for each of the mobile stations a difference between a rank of the radio channel quality and the invalid frequency; and a process of assigning the transmission opportunity to a mobile station having a smallest difference.

That is, the scheduling method according to the present invention is a method of radio base station performing packet scheduling on a plurality of mobile stations, obtains a rank of the current radio channel quality from the result of arranging, in a preferable order, radio channel quality observed before by a predetermined frequency from the current point for each mobile station, and assigns a transmission opportunity to a mobile station depending on the rank. For example, a mobile station having the smallest change in average radio channel quality can be assigned a transmission opportunity.

Furthermore, the scheduling method according to the present invention is a method of radio base station performing packet scheduling on a plurality of mobile stations, obtains a rank of the current radio channel quality from the result of arranging, in a preferable order, radio channel quality observed before by a predetermined frequency from the current point for each mobile station, obtains the difference between the rank and the frequency at which a transmission opportunity has not been assigned, and assigns a transmission opportunity to a mobile station having the smallest difference.

As described above, since a transmission opportunity is assigned based on the rank of the radio channel quality when a mobile station is selected in the scheduling method according to the present invention, the probability that a transmission opportunity is assigned can be enhanced when the channel quality is improved with the lapse of time although the radio channel quality is low.

Furthermore, in the scheduling method according to the present invention, the rank can be enhanced with a substantially constant probability although the radio channel quality is substantially constant. Therefore, the probability that a transmission opportunity is assigned can be enhanced.

Also in the scheduling method according to the present invention, a transmission opportunity is assigned based on the index with the frequency at which a transmission opportunity has not been assigned taken in to account. Therefore, the problem that a transmission opportunity to a specific mobile station becomes lower can be avoided.

Thus, in the scheduling method according to the present invention, a scheduler capable of equally assigning a transmission opportunity to mobile stations can be realized.

The present invention has the effect of realizing a scheduler capable of equally assigning a transmission opportunity to mobile stations by the following configurations and operations.

DETAILED DESCRIPTION OF THE PREFERRED EMBODIMENTS

Figure 1:
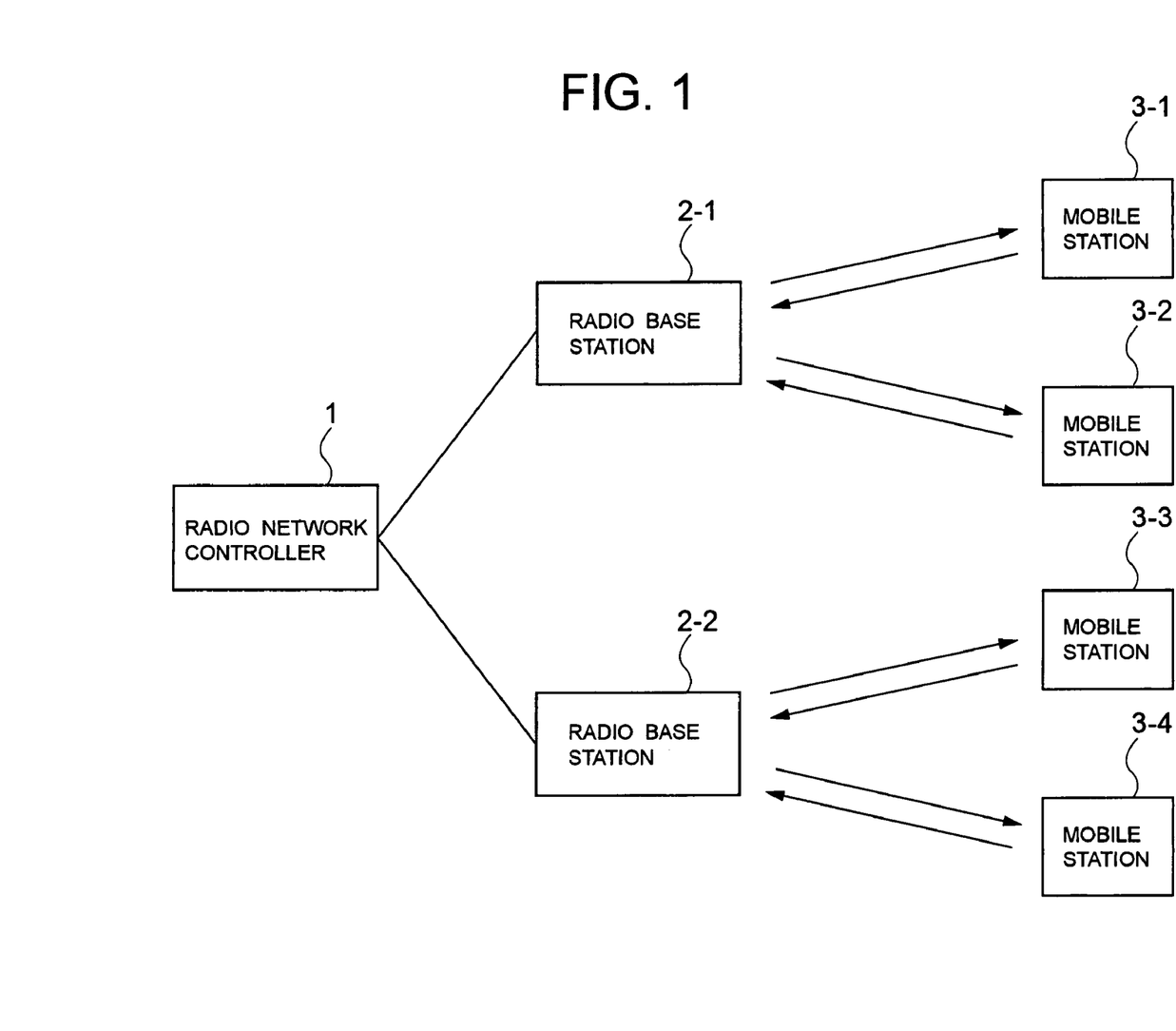
FIG. 1 is a block diagram showing the configuration of the mobile communications system according to an embodiment of the present invention.

The present invention is explained below by referring to the attached drawings. FIG. 1 is a block diagram showing the configuration of the mobile communications system according to an embodiment of the present invention. In FIG. 1, the mobile communications system according to an embodiment of the present invention is configured by a radio network controller 1, radio base stations 2-1 and 2-2, and mobile stations 3-1 to 3-4.

The radio network controller 1 is connected to a plurality of radio base stations 2-1 and 2-2. Each of the radio base stations 2-1 and 2-2 is connected to a plurality of mobile stations 3-1 to 3-4 through a radio link.

Figure 2:
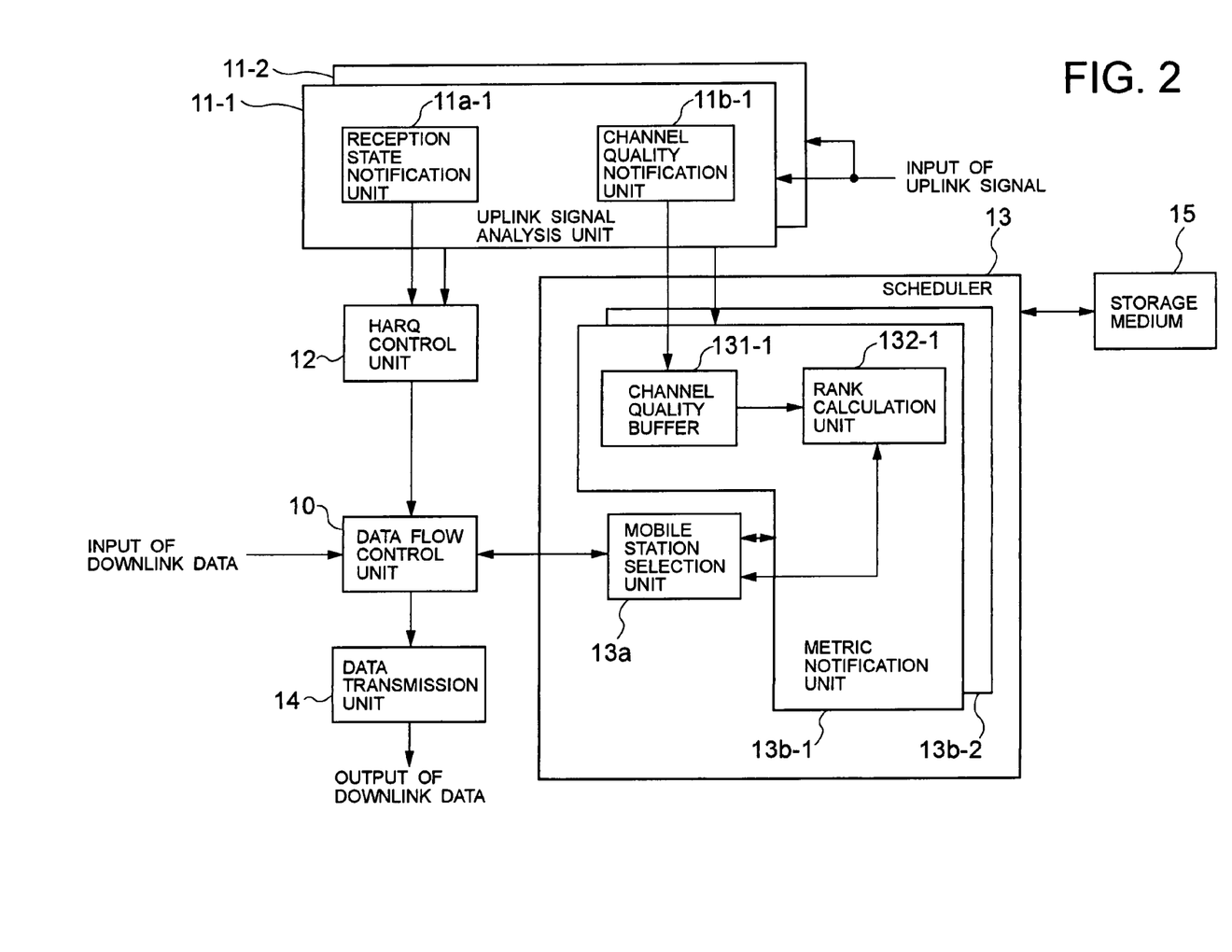
FIG. 2 is a block diagram showing the configuration of the radio base station shown in FIG. 1.

FIG. 2 is a block diagram showing the configuration of the radio base stations 2-1 and 2-2 shown in FIG. 1. FIG. 2 shows an example of a configuration for the case in which two mobile stations 3-1 and 3-2, or 3-3 and 3-4 are connected as shown in FIG. 1 to the radio base stations 2-1 and 2-2 (hereinafter the radio base stations 2-1 and 2-2 are collectively referred to as the radio base station 2).

A radio base station 2 comprises a data flow control unit 10, uplink signal analysis units 11-1 and 11-2, a HARQ (Hybrid Automatic Repeat reQuest) control unit 12, a scheduler 13, a data transmission unit 14, and a storage medium 15.

The uplink signal analysis units 11-1 and 11-2 are prepared for the mobile stations 3-1 to 3-4, and comprise reception state notification units 11a-1 and 11a-2 (the reception state notification unit 11a-2 is not shown in the attached drawings), and channel quality notification units 11b-1 and 11b-2 (the channel quality notification unit 11b-2 is not shown in the attached drawings).

The scheduler 13 is configured by a mobile station selection unit 13a and the metric notification units 13b-1 and 13b-2 for the mobile stations 3-1 to 3-4. The mobile station selection unit 13a is connected to the metric notification units 13b-1 and 13b-2. The metric notification units 13b-1 and 13b-2 are configured by channel quality buffers 131-1 and 131-2 (the channel quality buffer 131-2 is not shown in the attached drawings), and rank calculation units 132-1 and 132-2 (the rank calculation unit 132-2 is not shown in the attached drawings).

The data flow control unit 10 is connected to the radio network controller 1, the HARQ control unit 12, the scheduler 13, and the data transmission unit 14. The reception state notification unit 11a-1 is connected to the HARQ control unit 12. The channel quality notification unit 11b-1 is connected to the channel quality buffers 131-1 and 131-2 in the metric notification units 13b-1 and 13b-2 corresponding to the same mobile stations 3-1 to 3-4. All metric notification units 13b-1 and 13b-2 are connected to the mobile station selection unit 13a.

The storage medium 15 is connected to the scheduler 13, and stores not only the program (executable by a computer) to be executed by the scheduler 13 but also the programs executed respectively by the data flow control unit 10, the uplink signal analysis units 11-1 and 11-2, the HARQ control unit 12, and the data transmission unit 14.

The radio base station 2 which receives an uplink signal analyzes the uplink signal by the uplink signal analysis units 11-1 and 11-2 prepared for the mobile stations 3-1 to 3-4. Since an uplink signal includes a reception status and channel quality, the reception state notification units 11a-1 and 11a-2 and the channel quality notification units 11b-1 and 11b-2 notify the HARQ control unit 12 and the channel quality buffers 131-1 and 131-2 of the respective analysis results.

The HARQ control unit 12 determines whether or not it is necessary to perform retransmission based on the analysis result from the reception state notification units 11a-1 and 11a-2, and the result of the determination is announced to the data flow control unit 10.

When the data flow control unit 10 receives data from the radio network controller 1, it stores the data in a buffer whose data has not been transmitted (not shown in the attached drawings), and it transmits the data to the data transmission unit 14 according to an instruction of the mobile station selection unit 13a.

When the data flow control unit 10 transmits the data of a buffer whose data has not been transmitted, it transfers the data from the buffer whose data has not been transmitted to the buffer whose data has been transmitted (not shown in the attached drawings). When the data flow control unit 10 transmits data in the buffer whose data has been transmitted (in the case of data retransmission), it transmits data from the buffer whose data has been transmitted, and then stores the data as is.

The data transmission unit 14 applies an error correction code on the data from the data flow control unit 10, modulates the data, and transmits it to the corresponding mobile stations 3-1 to 3-4.

When the data flow control unit 10 receives a notification that it is not necessary to retransmit data from the HARQ control unit 12, the data flow control unit 10 discards the data stored in the buffer whose data has been transmitted. When the data flow control unit 10 receives a notification that it is necessary to retransmit data, the data flow control unit 10 stores the data as is in the buffer whose data has been transmitted.

Figure 3:
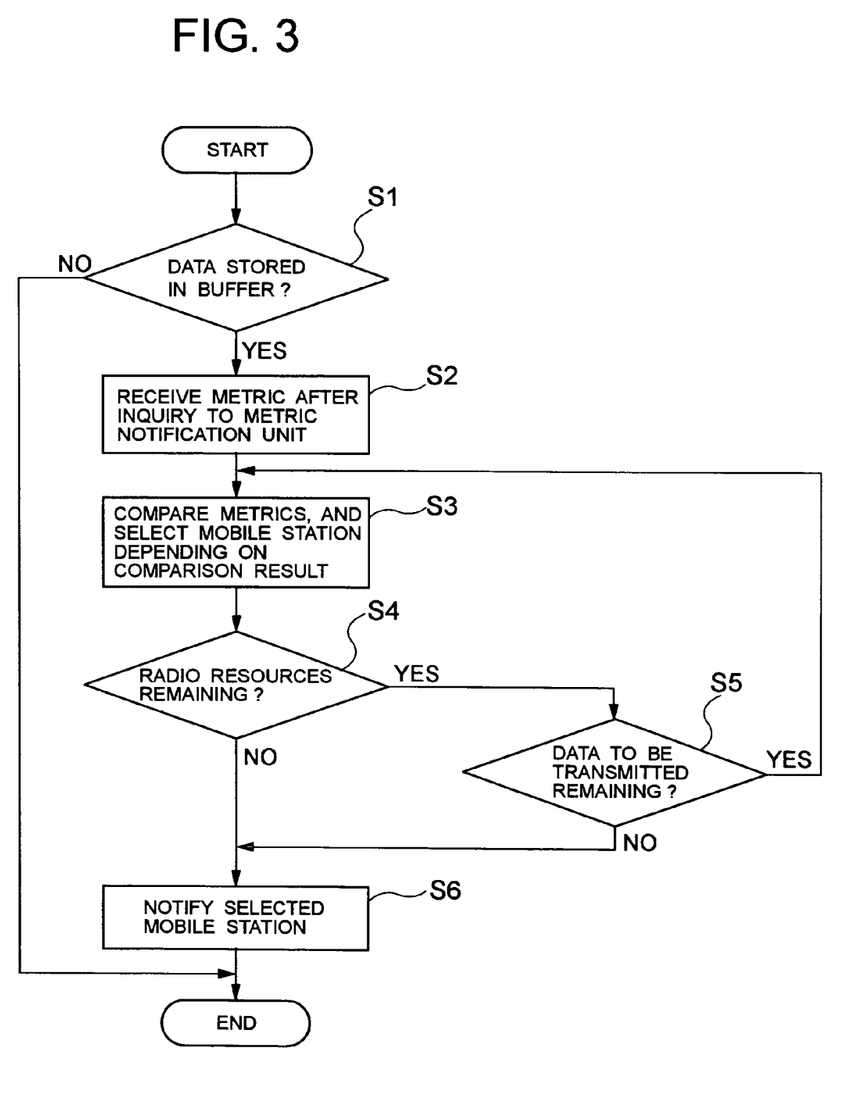
FIG. 3 is a flowchart showing the operations of the scheduler shown in FIG. 2.
Figure 4:
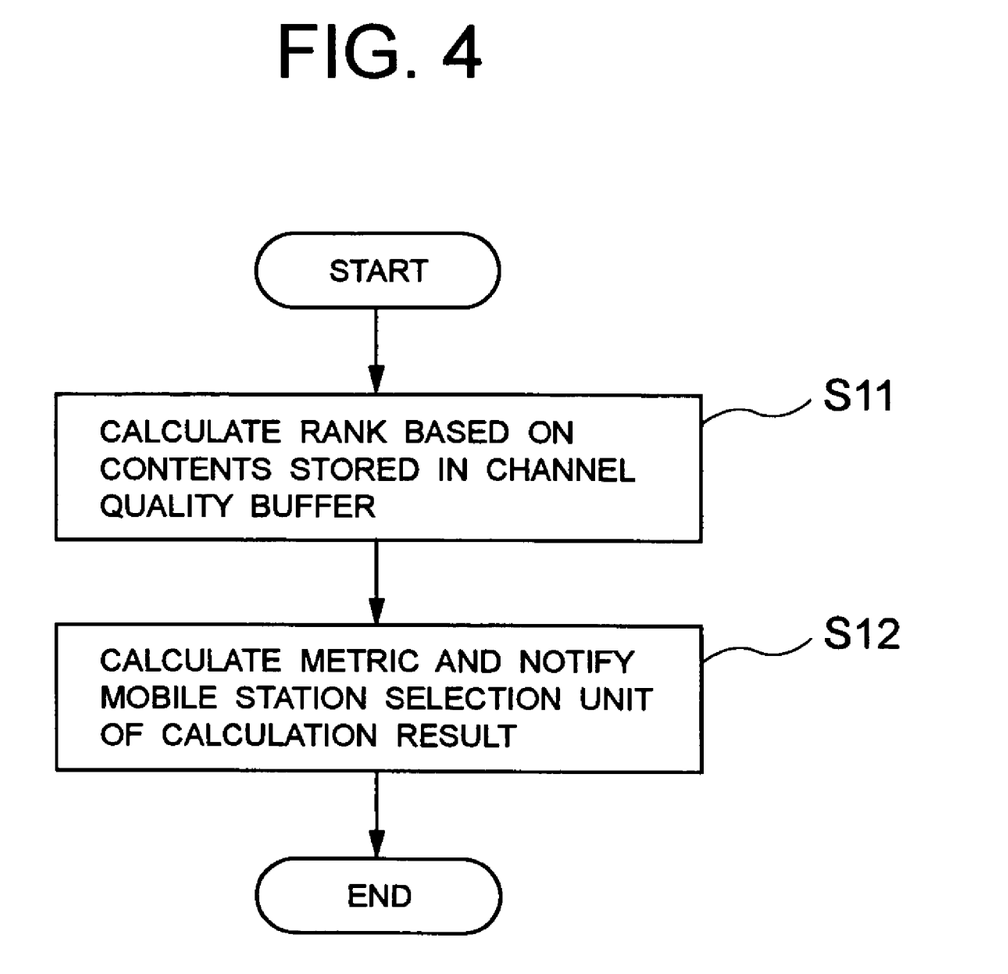
FIG. 4 is a flowchart showing the operation of the metric calculation unit shown in FIG. 2.

FIG. 3 is a flowchart showing the operation of the scheduler 13 shown in FIG. 2. FIG. 4 is a flowchart showing the operation of the metric notification units 13b-1 and 13b-2 shown in FIG. 2. By referring to FIGS. 2 to 4, the operation of the scheduler 13 is explained below. The process shown in FIGS. 3 and 4 can be realized by the scheduler 13 executing the program stored in the storage medium 15.

The mobile station selection unit 13a confirms whether or not the data is stored in the data buffer (not shown in the attached drawings) of the data flow control unit 10 in a packet transmission cycle, and receives a notification about the mobile stations 3-1 to 3-4 which store data (step S1 shown in FIG. 3). The mobile station selection unit 13a requests a metric notification to the metric notification units 13b-1 and 13b-2 corresponding to the mobile stations 3-1 to 3-4 announced from the data flow control unit 10, and receives metric (step S2 shown in FIG. 3).

The metric notification units 13b-1 and 13b-2 periodically receive radio channel quality information from the channel quality notification units 11b-1 and 11b-2 of the uplink signal analysis units 11-1 and 11-2, and store the radio channel quality information in the channel quality buffers 131-1 and 131-2. The radio channel quality information received from the uplink signal analysis units 11-1 and 11-2 can be the radio channel quality itself or an index indicating the radio channel quality.

The metric notification units 13b-1 and 13b-2 store the channel quality information reported before up to a predetermined number from the latest channel quality information, and the older channel quality information is discarded.

In the metric notification units 13b-1 and 13b-2, the rank calculation units 132-1 and 132-2 obtain the rank at the time when the channel quality is arranged in a preferable order in the channel quality buffers 131-1 and 131-2 based on the channel quality information stored in the channel quality buffers 131-1 and 131-2 (step S11 shown in FIG. 4), and the result is given to the mobile station selection unit 13a as metric (step S12 shown in FIG. 4).

The mobile station selection unit 13a selects the mobile stations 3-1 to 3-4 whose metrics transmitted from the metric notification units 13b-1 and 13b-2 are the smallest (step S3 shown in FIG. 3). When there are a plurality of mobile stations 3-1 to 3-4 whose metrics are the smallest, the mobile station selection unit 13a selects one of the mobile stations whose metrics are the smallest at random.

After the mobile station selection unit 13a assigns the radio resources to the selected mobile stations 3-1 to 3-4, it determines whether or not there are sufficient radio resources (step S4 in FIG. 3). When there are sufficient radio resources, the mobile station selection unit 13a determines whether or not there are the mobile stations 3-1 to 3-4 capable of transmitting data (step S5 shown in FIG. 3).

The mobile station selection unit 13a sequentially assigns radio resources to the mobile stations 3-1 to 3-4 having the smallest metrics in each case until either the radio resources are exhausted or there are no more mobile stations 3-1 to 3-4 which can transmit data. If the radio resources have been exhausted or there are no more mobile stations 3-1 to 3-4 which can transmit data (steps S4 and S5 shown in FIG. 3), then the mobile station selection unit 13a notifies the data flow control unit 10 of the mobile stations 3-1 to 3-4 to which the radio resources have been assigned (step S6 shown in FIG. 3).

Thus, according to the present invention, the mobile stations 3-1 to 3-4 are selected based on the calculated rank in radio channel quality, and a transmission opportunity is assigned to the selected mobile stations 3-1 to 3-4. Therefore, the probability that a transmission opportunity is assigned can be enhanced when the channel quality is improved with the lapse of time although the radio channel quality is low.

Furthermore, in the present embodiment, the rank in radio channel quality is enhanced with the lapse of time with a substantial constant radio channel quality. Therefore, the probability that a transmission opportunity is assigned can be enhanced.

As a result, according to the present invention, the scheduler 13 capable of equally assigning a transmission opportunity to the mobile stations 3-1 to 3-4 can be realized.

Figure 5:
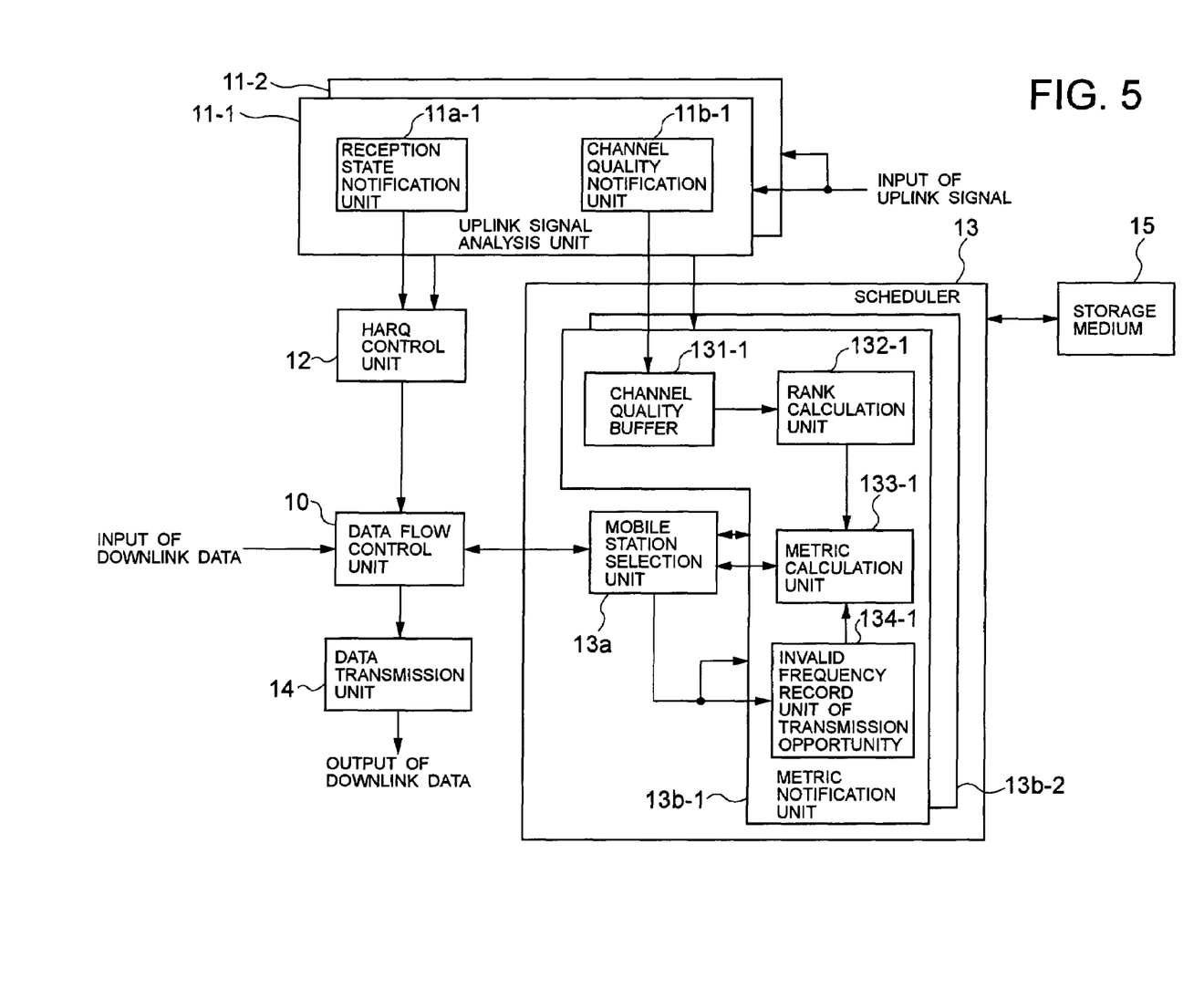
FIG. 5 is a block diagram showing the configuration of the radio base station according to another embodiment of the present invention.

FIG. 5 is a block diagram showing the configuration of the radio base station according to another embodiment of the present invention. In FIG. 5, the radio base station according to another embodiment is the same in configuration as the radio base station 2 according to an embodiment of the present invention as shown in FIG. 2 except that the metric calculation units 133-1 and 133-2 (the metric calculation unit 133-2 is not shown in the attached drawings) and the invalid frequency record units of the transmission opportunity 134-1 and 134-2 (the invalid frequency record unit of the transmission opportunity 134-2 is not shown in the attached drawings) are added to the metric notification units 13b-1 and 13b-2. The identical components are assigned the same reference numerals.

Although not shown in the attached drawings, the configuration of the mobile communications system according to another embodiment of the present invention is the same as the configuration of the mobile communications system according to the embodiment of the present invention shown in FIG. 1.

Figure 6:
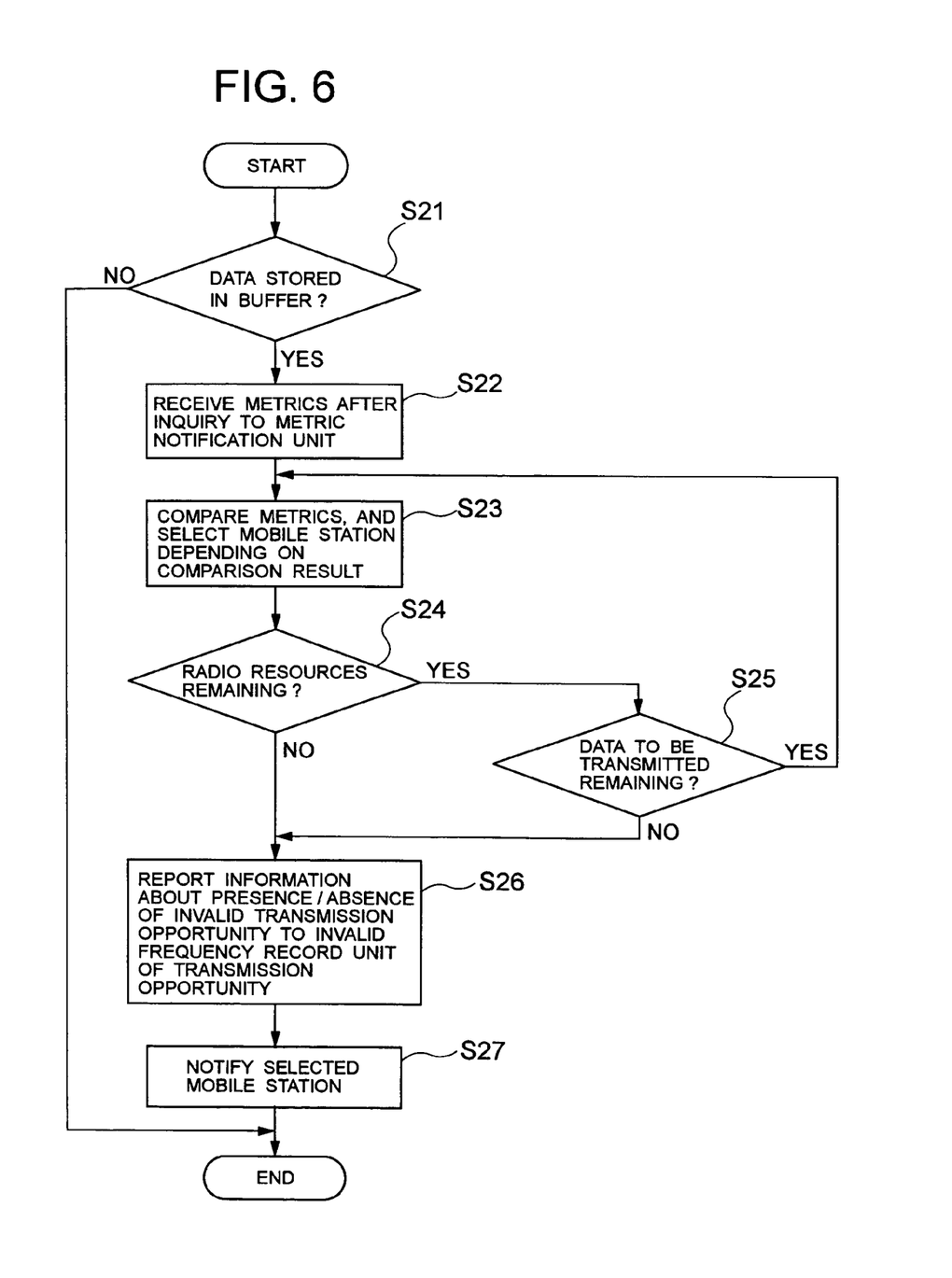
FIG. 6 is a flowchart showing the operation of the scheduler shown in FIG. 5.
Figure 7:
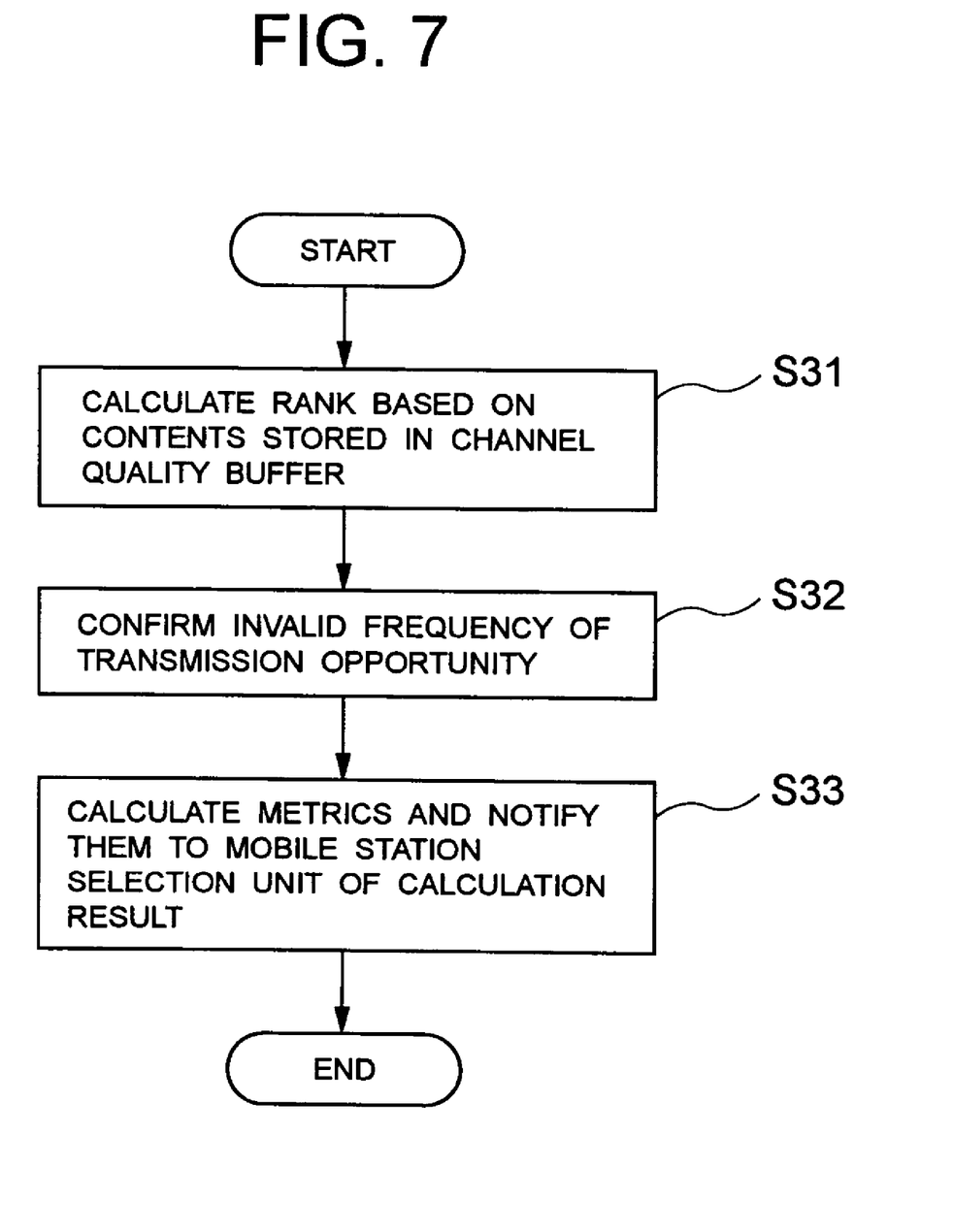
FIG. 7 is a flowchart showing the operation of the metric calculation unit shown in FIG. 5.

FIG. 6 is a flowchart of the operation of the scheduler 13 shown in FIG. 5. FIG. 7 is a flowchart of the operation of the metric notification units 13b-1 and 13b-2 shown in FIG. 5. The operations of the scheduler 13 according to another embodiment of the present invention are described below by referring to FIGS. 5 to 7. The processes in FIGS. 6 and 7 are realized by the scheduler 13 executing the program stored in the storage medium 15.

The mobile station selection unit 13a checks whether or not data is stored in the data buffer of the data flow control unit 10 on the packet transmission cycle, and is informed of the mobile stations 3-1 to 3-4 storing data (step S21 shown in FIG. 6). The mobile station selection unit 13a requests the metric notification units 13b-1 and 13b-2 of the informed mobile stations 3-1 to 3-4 for a metric notification, and the metric notification units 13b-1 and 13b-2 notify the mobile station selection unit 13a of the calculated metrics (step S22 shown in FIG. 6).

The mobile station selection unit 13a selects one of the mobile stations 3-1 to 3-4 whose metric is the smallest according to the notifications from the metric notification units 13b-1 and 13b-2 (step S23 shown in FIG. 6). When there are a plurality of mobile stations 3-1 to 3-4 having the smallest metrics, the mobile station selection unit 13a selects one of them at random.

After the mobile station selection unit 13a assigns the radio resources to the selected mobile stations 3-1 to 3-4, it determines whether or not there are sufficient radio resources (step S24 shown in FIG. 6). If there are sufficient radio resources, the mobile station selection unit 13a determines whether or not there are any mobile stations 3-1 to 3-4 which can transmit data (step S25 shown in FIG. 6).

The mobile station selection unit 13a sequentially assigns radio resources to the mobile stations 3-1 to 3-4 having the smallest metrics until either the radio resources are exhausted (step S24 shown in FIG. 6) or there are no more mobile stations 3-1 to 3-4 which can transmit data (step S25 shown in FIG. 6). When the mobile station selection unit 13a completes assigning the radio resources, it transmits to the invalid frequency record units of the transmission opportunity 134-1 and 134-2 (step S26 shown in FIG. 6) the information as to whether or not an invalid of the transmission opportunity has occurred during the assigning process, and notifies the data flow control unit 10 of the mobile stations 3-1 to 3-4 to which the radio resources have been assigned (step S27 shown in FIG. 6).

Then, the operations of the metric notification units 13-1 and 13-2 are described below by referring to FIG. 7. Since the operations of the metric notification units 13*b*-1 and 13*b*-2 for the mobile stations 3-1 to 3-4 are the same, the operation of one of the mobile stations is explained here.

The metric notification units 13*b*-1 and 13*b*-2 periodically receive the radio channel quality information from the channel quality notification units 11*b*-1 and 11*b*-2 of the uplink signal analysis units 11-1 and 11-2, and store the information in the channel quality buffers 131-1 and 131-2. In this case, the radio channel quality information notified from the channel quality notification units 11*b*-1 and 11*b*-2 can be radio channel quality itself or an index indicating the radio channel quality.

The metric notification units 13*b*-1 and 13*b*-2 store the channel quality information reported before from the latest channel quality information up to the information of a predetermined number of pieces, and discard the older channel quality information.

Upon receipt of a request for a metric notification from the mobile station selection unit 13*a*, the metric notification units 13*b*-1 and 13*b*-2 calculate metrics. When metrics are calculated, the rank calculation units 132-1 and 132-2 first calculate the rank with the channel quality preferably arranged in the channel quality buffers 131-1 and 131-2 according to the channel quality information stored in the channel quality buffers 131-1 and 131-2 (step S31 shown in FIG. 7).

Simultaneously, the metric notification units 13*b*-1 and 13*b*-2 obtain the invalid frequency of the transmission opportunity from the invalid frequency record units of the transmission opportunity 134-1 and 134-2 (step S32 shown in FIG. 7). In the metric calculation units 133-1 and 133-2, the difference between the rank obtained by the rank calculation units 132-1 and 132-2 and the invalid frequency stored in the invalid frequency record units of the transmission opportunity 134-1 and 134-2 is obtained and transmitted to the mobile station selection unit 13*a* (step S33 shown in FIG. 7).

The mobile station selection unit 13*a* selects the mobile stations 3-1 to 3-4 based on the difference reported from the metric calculation units 133-1 and 133-2, and assigns radio resources to the mobile stations 3-1 to 3-4. When the assignment of the radio resources are completed, the mobile station selection unit 13*a* reports the information about the invalid of the transmission opportunity to the metric notification units 13*b*-1 and 13*b*-2.

If the radio resources have not been assigned although the metrics are the smallest, the invalid frequency record units of the transmission opportunity 134-1 and 134-2 update the stored value of invalid frequency (for example, increment of 1). When the radio resources have been assigned, the invalid frequency record units of the transmission opportunity 134-1 and 134-2 initialize the stored value of invalid frequency. If the radio resources have not been assigned, the invalid frequency record units of the transmission opportunity 134-1 and 134-2 do nothing. When the invalid frequency record units of the transmission opportunity 134-1 and 134-2 are initialized, they are set to 0.

Thus, according to the present embodiment, since a transmission opportunity is assigned according to the index with the frequency at which a transmission opportunity has not been assigned taken into account, the reduction of transmission opportunities to a specific mobile station can be avoided. Therefore, a transmission opportunity can be equally assigned to the mobile stations 3-1 to 3-4 by the scheduler 13 according to the present invention.

What is claimed is:

1. A mobile communications system having a plurality of mobile stations for transmitting radio channel quality information using an uplink dedicated channel and a radio base station for communicating with the plurality of mobile stations and transmitting packets to the plurality of mobile stations using a downlink shared channel, said radio base station comprising: rank calculation means for calculating a rank for a mobile station based on radio channel quality reported in a predetermined observation interval; opportunity accumulating means for accumulating a number of times that a transmission opportunity has not been assigned to the mobile station; metric calculating means for determining a calculated numerical difference between the rank and the number of times; and assigning means for assigning a transmission opportunity to the mobile station based on the calculated numerical difference.

2. The mobile communications system according to claim 1, wherein said assigning means assigns the transmission opportunity to a selected mobile station at random from among a plurality of mobile stations having the same difference.

3. The mobile communications system according to claim 2, wherein the means for accumulating resets the number of times to zero when a transmission opportunity is assigned.

4. The mobile communications system according to claim 2, wherein the means for accumulating initializes the number of times to zero.

5. A radio base station which communicates with a plurality of mobile stations for transmitting radio channel quality information using an uplink dedicated channel and transmits a packet to the plurality of mobile stations using a downlink shared channel, comprising: rank calculation means for calculating a rank of a mobile station based on radio channel quality reported in an a predetermined observation interval; opportunity accumulating means for accumulating a number of times that a transmission opportunity has not been assigned to the mobile station; metric calculating means for determining a calculated numerical difference between the rank and the number of times; and assigning means for assigning a transmission opportunity to the mobile station based on the calculated numerical difference.

6. The radio base station according to claim 5, wherein said assigning means assigns the transmission opportunity to a selected mobile station at random from among a plurality of mobile stations having the same difference.

7. The radio base station according to claim 6, wherein the means for accumulating resets the number of times to zero when a transmission opportunity is assigned.

8. The radio base station according to claim 6, wherein the means for accumulating initializes the number of times to zero.

9. A scheduling apparatus which draws a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, comprising: rank calculation means for calculating a rank of a mobile station based on radio channel quality reported in an a predetermined observation interval; opportunity accumulating means for accumulating a number of times that a transmission opportunity has not been assigned to the mobile station; metric calculation means for determining a calculated numerical difference between the rank and the number of times; and assigning means for assigning a transmission opportunity to the mobile station based on the calculated numerical difference.

10. The scheduling apparatus according to claim 9, wherein said assigning means assigns the transmission opportunity to a selected mobile station at random from among the plurality of mobile stations having the same difference.

11. The scheduling apparatus according to claim 10, wherein the means for accumulating resets the number of times to zero when a transmission opportunity is assigned.

12. The scheduling apparatus according to claim 10, wherein the means for accumulating initializes the number of times to zero.

13. A scheduling method for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, comprising: calculating a rank of a mobile station based on radio channel quality reported in an a predetermined observation interval; accumulating a number of times that a transmission opportunity has not been assigned to the mobile station; determining a calculated numerical difference between the rank and the number of times; and assigning the transmission opportunity to the mobile station based on the calculated numerical difference.

14. The scheduling method according to claim 13, further comprising assigning the transmission opportunity to a selected mobile station at random from among a plurality of mobile stations having the same difference.

15. The scheduling method according to claim 14, further comprising resetting the number of times to zero when a transmission opportunity is assigned.

16. The scheduling method according to claim 14, further comprising initializing the number of times to zero.

17. A computer readable medium encoded with a computer program for use with a scheduling method for drawing a schedule of a packet in a mobile communications system having a plurality of mobile stations for transmitting radio channel quality information using an uplink dedicated channel and a radio base station for communicating with the plurality of mobile stations and transmitting a packet to the plurality of mobile stations using a downlink shared channel, wherein when said computer program is loaded and run from said computer readable medium, a computer of said radio base station performs a process of: calculating a rank of a mobile station based on radio channel quality reported in an a predetermined observation interval; accumulating a number of times that a transmission opportunity has not been assigned to the mobile station; determining a calculated numerical difference between the rank and the number of times; and assigning the transmission opportunity to the mobile station based on the calculated numerical difference.

* * * * *